United States Patent [19]

Harjar et al.

[11] 4,372,721
[45] Feb. 8, 1983

[54] APPARATUS FOR CALIBRATING LINK POSITION TRANSDUCERS OF A TEACHING ROBOT AND A WORK ROBOT

[75] Inventors: Martin J. Harjar, Vermilion; Jeffrey S. Noss, Bay Village, both of Ohio

[73] Assignee: Nordson Corporation, Amherst, Ohio

[21] Appl. No.: 264,224

[22] Filed: May 18, 1981

[51] Int. Cl.³ .............................................. B25J 1/00
[52] U.S. Cl. ........................................ 414/5; 73/1 J; 414/730
[58] Field of Search .................. 414/1, 4, 5, 730, 909; 73/1 E, 1 J

[56] References Cited
U.S. PATENT DOCUMENTS

| | | | |
|---|---|---|---|
| 3,496,758 | 2/1970 | Sunnen | 73/1 J |
| 3,986,007 | 10/1976 | Ruoff, Jr. | 414/730 X |
| 4,239,431 | 12/1980 | Davini | 414/4 X |
| 4,300,198 | 11/1981 | Davini | 414/730 X |

*Primary Examiner*—Robert J. Spar
*Assistant Examiner*—Terrance L. Siemens
*Attorney, Agent, or Firm*—Wood, Herron & Evans

[57] ABSTRACT

A calibration fixture is disclosed for calibrating the link position transducer output signals of a teaching robot and a work robot such that when the links thereof occupy the same identical spatial position and orientation, the magnitudes of the corresponding link position transducer outputs of the work and teaching robots will be the same.

13 Claims, 4 Drawing Figures

Fig. 1

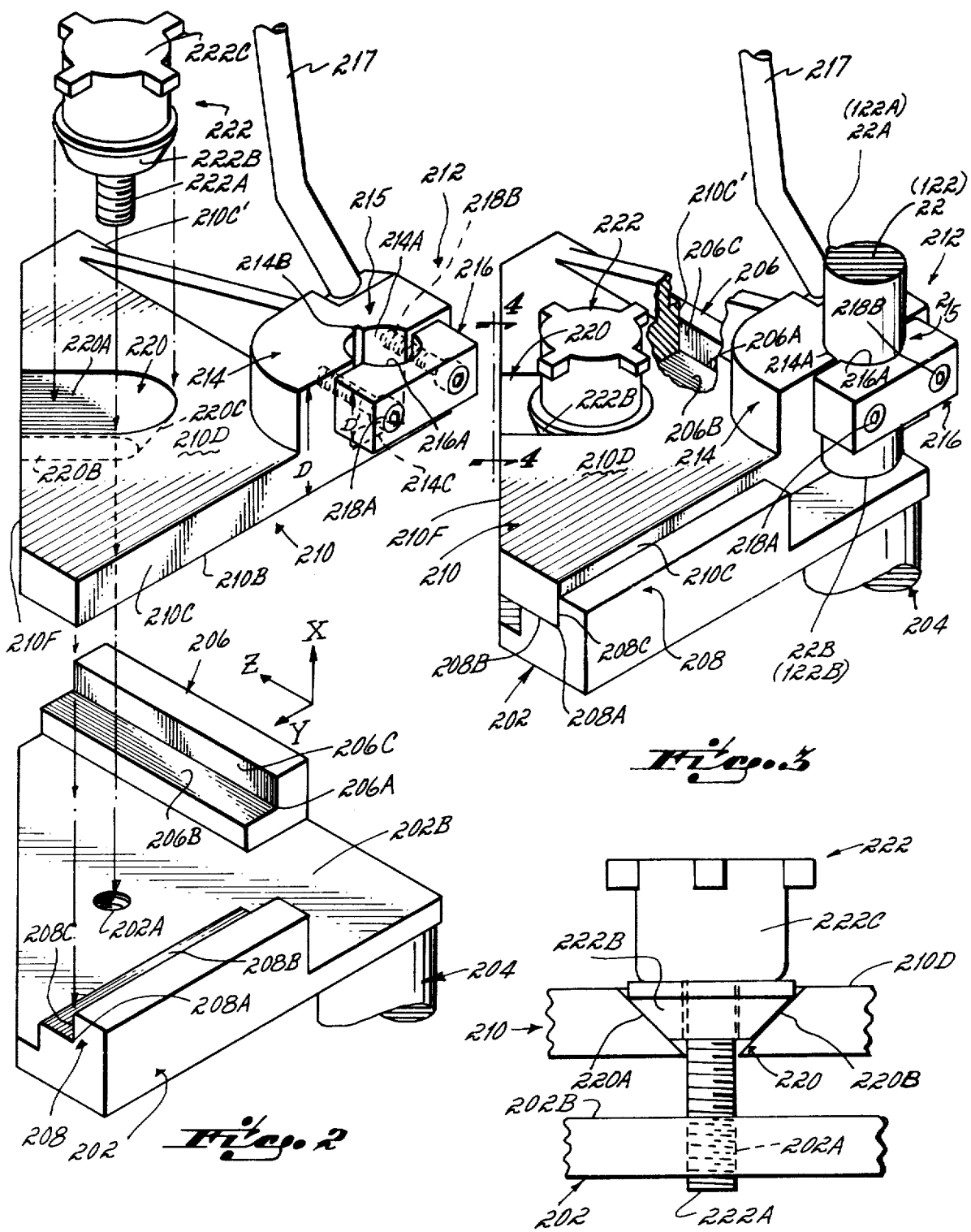

APPARATUS FOR CALIBRATING LINK POSITION TRANSDUCERS OF A TEACHING ROBOT AND A WORK ROBOT

This invention relates to programming a relatively massive, powered work robot with a relatively lightweight, unpowered, manually manipulatable teaching robot having links and degrees of freedom simulating those of the work robot, and more particularly to calibration of the link position transducers of the work and teaching robots such that their outputs are identical when their respective links occupy identical predetermined reference positions and orientations in space.

A work-performing robot, hereinafter referred to as a work robot, typically includes a base from which extends a series of articulated links interconnected at joints to provide plural degrees of freedom, each joint having an actuator for moving the links interconnected thereat relative to each other and a position transducer for providing a signal correlated to the relative position of the associated interconnected links. At least some of the links of the work robot are relatively massive such that any effort to manually move them for the purpose of programming the robot is impractical, if not virtually impossible. To facilitate programming a relatively massive powered work robot, a relatively lightweight, manually manipulatable, unpowered teaching robot has been developed.

The teaching robot, like the work robot, has a base from which extends a series of articulated links interconnected at joints to provide plural degrees of freedom, with each joint having a position transducer for providing a signal correlated to the relative position of the links interconnected thereat. The series of links of the teaching robot, as well as the degrees of freedom thereof, simulate those of the work robot. To generate a program with a teaching robot which can be stored and thereafter input to the work robot to cause the work robot to produce the desired programmed sequence of motions, the output link of the lightweight teaching robot is manually moved through the desired sequence of motions for which it is desired to program the work robot. As the output link of the teaching robot is manually moved through the desired sequence of motions, the outputs of the link position transducers thereof are separately recorded. The recorded link position transducer outputs of the teaching robot, obtained during the course of manually manipulating the output link thereof through the desired sequence of motions, are stored. The stored teaching robot link position transducer output signals, which function as position commands, can then be input to a suitable controller associated with the work robot. The controller, on a link-by-link basis, compares the stored link position signals or commands, generated by the teaching robot during programming, against the actual position signals of the work robot generated by their associated link position transducer output signals. Errors between the programmed position signals or commands and the actual positions of the respectively associated work robot links are input to the actuators of the work robot links, causing the work robot links to execute the programmed sequence of motions through which the links of the teaching robot were manually moved during the programming phase.

To enhance the accuracy with which the work robot link motions during program execution phase emulate the motions of the teaching robot links during the program generation phase, it is important that the outputs of the work robot link position transducers be identical to the outputs of the teaching robot link position transducers when the respective work robot and teaching robot links occupy identical spatial positions and orientations. If the link position outputs of the work and teaching robot transducers are not equal, work robot link motions during program execution will be in error to the extent of any differences which exist between the outputs of the link position transducers of the respective robots.

Accordingly, it has been an objective of this invention to provide apparatus for calibrating the link position transducers of the work and teaching robots prior to program generation with the teaching robot such that the link position transducer outputs of the respective work and teaching robots will be identical when the corresponding links thereof occupy the identical positions and orientations in space. To accomplish this objective a calibration fixture has been provided for use in association with work and teaching robots mounted on a common base which permits each to be operatively positioned on an alternative basis with respect to a work place whereat the calibration fixture is mounted. The calibration fixture includes a stationary member having first, second, and third mutually orthogonal locating surfaces which is fixedly mounted in a predetermined reference spatial position in the work place; a movable member alternatively mountable to the output link of the work and teaching robot when located at the work place, the movable member having first, second, and third mutually orthogonal locating surfaces configured to simultaneously contact the respective first, second, and third locating surfaces of the stationary member only when the movable member occupies said predetermined reference spatial position and orientation; and positioning means, preferably including cam means, jointly associated with the movable and stationary members to cam their respective first, second, and third locating surfaces simultaneously into contact with each other to locate the movable member at said predetermined reference spatial position and orientation.

With the calibration fixture of this invention, the teaching robot is positioned in operative relation with respect to the work place whereat the calibration fixture is located, and when so positioned the output link thereof is fixedly fastened to the movable member and the movable member then positioned, using the cam positioning means, to simultaneously locate the first, second, and third locating surfaces thereof in contact with the first, second, and third locating surfaces of the stationary member. The outputs of the teaching robot link position transducers are recorded. The work robot is then positioned in operative relationship to the work space, and with the aid of the cam positioning means the movable member of the calibration fixture, which is fasened to the output link of the teaching robot, is positioned such that its first, second, and third locating surfaces simultaneously contact the first, second, and third locating surfaces of the stationary fixture member. The outputs of the work robot link position transducers are then adjusted to equal those exhibited by the corresponding transducers of the teaching robot when it was in operative position at the work space and its output link positioned via the calibration fixture in the predetermined reference spatial position and orientation. With the outputs of the work and teaching robot link position transducers exhibiting identical values for identical spatial positions and orientations of their respectively associated links, the output link of the teaching robot can be manually manipulated in the desired sequence of motions and the link position transducer outputs thereof recorded for subsequent input to the controller of the work robot to cause the work robot to move in a manner such that the links thereof accurately emulate the programmed motion sequence generated with the teaching robot.

In accordance with a preferred embodiment of the invention, the stationary member is generally plate-shaped and includes on its upper surface a pair of elongated abutment members oriented generally perpendicularly to each other, each having an elongated shoulder. The shoulders, in turn, each have a first elongated horizontal surface which collectively comprise the first surface of the stationary member. The shoulders each also have a second elongated surface, which is vertical and perpendicular to its respectively associated first elongated surface, with the second elongated surfaces collectively comprising the second and third locating surfaces of the stationary member. The movable member is also preferably plate-shaped having a planar surface on the bottom thereof defining a first locating surface for the movable member, and a pair of adjacent edge surfaces disposed perpendicularly to each other and to the planar surface thereof, which collectively define the second and third locating surfaces of the movable member. Further included in the preferred embodiment is cam positioning means having a slot in the plate of the movable member bounded by cam surfaces, the slot being disposed to bisect the angle formed by the pair of adjacent edge surfaces. The cam positioning means further includes a screw threadable into the stationary plate which has a conical screw head. The conical screw head engages the cam surfaces bounding the slot when the movable plate is in closely adjacent overlying relationship to the stationary plate. When the screw is tightened the conical screw head thereof engages the cam surfaces bounding the slot of the movable plate to simultaneously urge (a) the horizontal planar surface of the movable plate toward the first elongated horizontal surfaces of the two elongated abutment members on the stationary plate, and (b) the vertical edge surfaces of the movable plate toward the second elongated vertical surfaces of the elongated abutment members, to drive the movable member to the predetermined reference spatial position and orientation.

These and other features, advantages and objectives of the invention will be more readily apparent from a detailed description of the invention in which:

FIG. 1 is a perspective view, in schematic form, of the calibration fixture of this invention showing it as used in a typical robot installation of the type having a powered, relatively massive work robot and an unpowered, relatively lightweight, manually manipulatable teaching robot, both being mounted on a single rotatable base to permit each to be located on an alternative basis in operative position with respect to a workstation/workpiece.

FIG. 2 is a perspective view, partially exploded, of a preferred embodiment of the calibration apparatus of this invention.

FIG. 3 is a perspective view of the output link of the teaching robot located in a predetermined reference spatial position and orientation with the aid of the calibration fixture of this invention.

FIG. 4 is a view along line 4—4 of FIG. 3.

Figure 1:
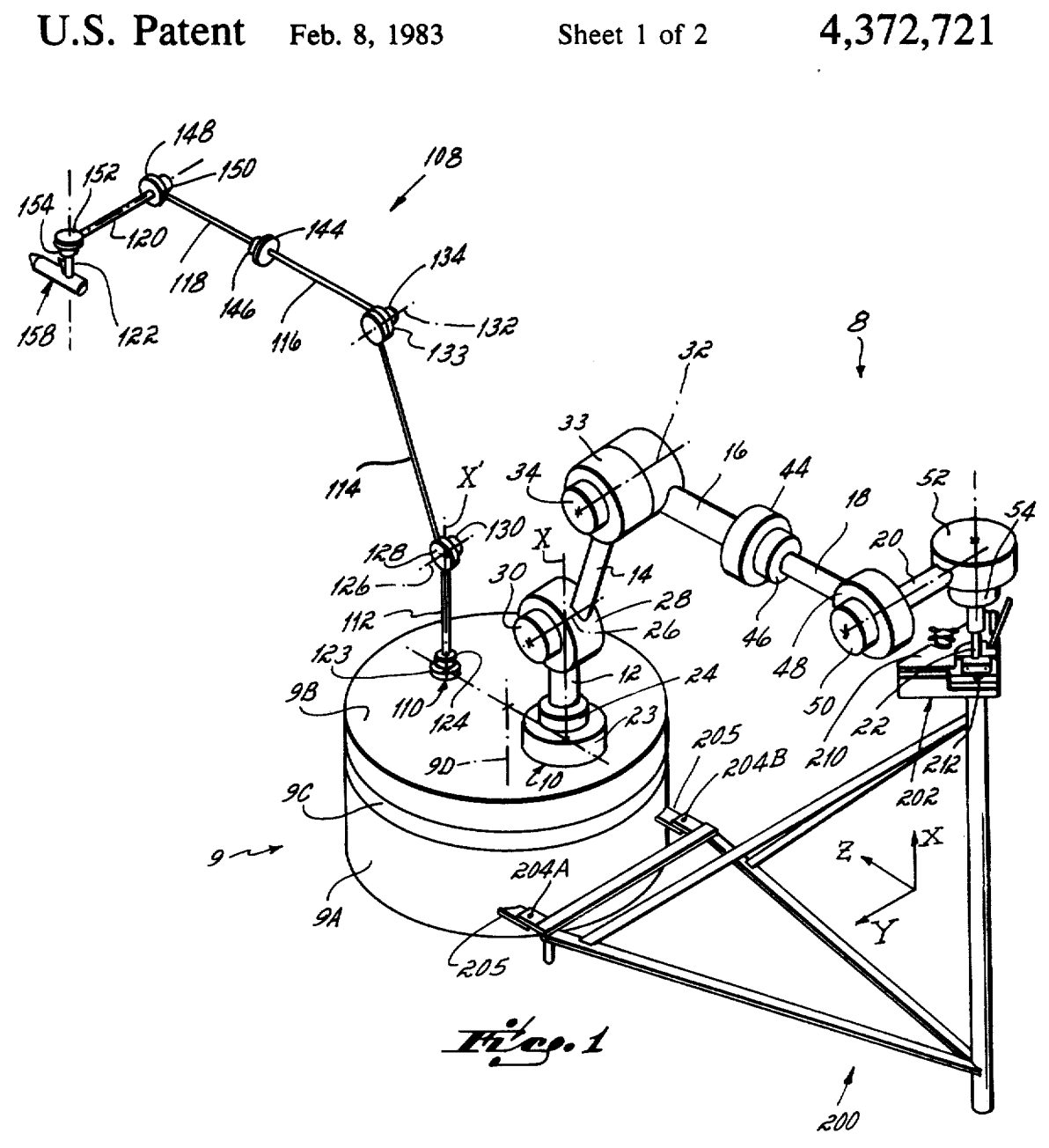

With reference to FIG. 1, a typical robot installation, including a teaching robot 108 and a work-performing robot 8, with respect to which this invention is useful in aligning the respective robot links thereof in an identical manner relative to a workstation, is seen to include a base 9 for supporting, in common, both the teaching and work robots. The base 9 includes a lower stationary section 9A which mounts on the floor or other appropriate support surface, and an upper section 9B which is rotatable relative to the lower base section on bearings 9C about a vertical axis 9D. Stationarily mounted relative to the upper base section 9B are separate bases 10 and 110 of the work robot 8 and teaching robot 108. The bases 10 and 110 are mounted such that the vertical axes X and X' of their respective azimuthal actuators 23 and 123, to be described, are (a) on diametrically opposed sides of the axis of rotation 9D of the upper base section 9B, (b) at the same elevation, and (c) at equal distances from the axis 9D. In this way, the work robot 8 and teaching robot 108 can be located, on an alternative basis, in operative relationship to a workstation and/or workpiece with respect to which the work robot, when suitably programmed by the teaching robot in a manner to be described, can execute a desired programmed sequence of motions.

The work robot 8, as noted, includes the base 10. Extending from the base 10 are plural, series-connected, elongated, articulated members or links 12, 14, 16, 18, 20, and 22 which, in the preferred embodiment, provide the robot with several, in this instance six, degrees of freedom. In practice, the links 12, 14, 16, 18, 20, and 22 collectively constitute a relatively large mass. For example, the links 12, 14, and 16 are each approximately 1–4 feet in length, and typically weigh in the range of 10–400 pounds each. The links 18, 20, and 22 which, in the work-performing robot shown in FIG. 1 constitute a wrist, typically are significantly less massive than the links 12, 14, and 16, although this is not necessarily the case.

The link 12 is vertically disposed and mounted to the base 10 by a suitable joint which permits the link to rotate about its longitudinal axis which is coincident with the X axis. An actuator 23 is associated with the link 12, and is responsive to a position error signal provided by a conventional robot controller (not shown) to facilitate selective, bidirectional, angular motion of the link 12 in an azimuthal direction about its longitudinal axis to the desired link position. Also associated with the link 12 is a position transducer 24 which provides an electrical signal correlated to the actual angular, or azimuthal, position of the link 12 relative to the base 10.

The link 14 at its lower end is connected to the upper end of the link 12 by a suitable joint for permitting pivotal, elevational movement of the link 14 in a vertical plane about a horizontal axis 26 which is perpendicular to the X axis and parallel to the Y—Z plane. Associated with the link 14 is an actuator 28 which is responsive to a position error signal from the robot controller and facilitates selective, bidirectional, elevational, pivotal movement of the link 14 about horizontal axis 26 to the desired link position. Also associated with the link 14 is a position transducer 30 which provides an electrical signal correlated to the actual elevational position of the link 14 relative to the link 12.

The link 16 at its inner end is connected to the upper end of the link 14 by a suitable joint for permitting the link 16 to move in a vertical plane about horizontal axis 32 which is parallel to axis 26. A suitable transducer 34 is associated with the link 16 for providing an electrical signal correlated to the actual angular elevational position of the link 16 with respect to the link 14. An actuator 33, associated with the link 16, is responsive to a position error signal from the robot controller and facilitates selective, bidirectional, elevational, pivotal movement of the link 14 about horizontal axis 32 to the desired link position.

The actuator 23 which bidirectionally drives the link 12 about the X axis provides the work-performing robot with one degree of freedom, namely, azimuthal positioning motion, while the actuators 28 and 33 which bidirectionally drive the link 14 and link 16, respectively, provide the robot with two degrees of freedom, each in an elevational direction.

The articulated links 18, 20, and 22 collectively constitute the wrist. Link 18 at its inner end is connected via a suitable joint to the outer end of the link 16. An actuator 44 is associated with the wrist member 18 for bidirectionally rotating, when input with suitable position error signals from the robot controller, the wrist member 18 to the desired link position about its longitudinal axis which is coincident with the longitudinal axis of the link 16. A suitable position transducer 46 is associated with the link 18 for providing an electrical signal correlated to the actual relative rotational position of the link 18 with respect to the link 16.

The link 20 is connected at its inner end via a suitable joint to the outer end of the link 18 for providing rotational movement of link 20 about its longitudinal axis which is perpendicular to the longitudinal axis of link 18. An actuator 48 is associated with link 20, and when input with suitable position error signals from the robot controller, bidirectionally rotates link 20 about its longitudinal axis perpendicular to the longitudinal axis of link 18 to the desired link position. A suitable position transducer 50 is also associated with link 20 for providing an electrical output correlated to the actual rotational position of this link relative to link 18.

Link 22 is connected via a suitable joint to the outer end of link 20 to facilitate rotation of link 22 about its longitudinal axis which is disposed perpendicularly to the longitudinal axis of link 20. An actuator 52 associated with link 22, when input with suitable position error signals from the robot controller, facilitates bidirectional motion of link 22 about its longitudinal axis to the desired link position. A transducer 54, also associated with link 22, provides an electrical signal output correlated to the actual relative rotational position of link 22 relative to link 20.

Link 22 constitutes the mechanical output element of the work-performing robot. While the mechanical output of the robot can be utilized for positioning a wide variety of devices, in the preferred form of the invention the work-performing robot is utilized to position a spray coating gun (shown only in connection with the teaching robot 108 described hereafter). The gun has a barrel with a nozzle which emits coating particles.

The longitudinal rotational axes of wrist links 18, 20, and 22 are mutually perpendicular, and accordingly constitute three degrees of freedom for the robot. These three degrees of freedom, coupled with the three degrees of freedom of the links 12, 14, and 16, provide a total of six degrees of freedom for the work-performing robot.

In the operation of the work-performing robot 8 shown in FIG. 1, a series of programmed, i.e., desired, link position signals stored in a suitable memory device of the robot controller are periodically retrieved and compared against the actual link position signals provided by the link position transducers 24, 30, 34, 46, 50, and 54, and in response thereto the link positional error signals are generated for each of the links 12, 14, 16, 18, 20, and 22. The positional error signals for the various links 12, 14, 16, 18, 20, and 22 are then input to the various link actuators, 23, 28, 33, 44, 48, and 52, which typically are of the servo-controlled electrohydraulic type, for moving the links to the desired, or programmed, positions which in turn reduce the positional error signals to zero. Thus, the links of the work-performing robot 8 of FIG. 1 are driven through the programmed sequence of desired motions, utilizing closed-loop servo techniques, by periodically comparing desired position signals retrieved from the memory of the robot controller with actual link position signals from their associated position transducers, and using the resulting positional error signals associated with the different links to drive the various link actuators to the desired, or programmed, positions.

Since the robot controller, actuators, position transducers, closed-loop servo controls, and the like of the work-performing robot 8 of FIG. 1 are well known and form no part of this invention, they are not further discussed in detail herein.

The teaching robot 108, also shown in FIG. 1, which is useful in programming the work robot 8, includes the base 110 from which extends vertically a link 112 which is connected to the base for rotational movement about a vertical axis by a rotary joint 123. A position transducer 124 associated with the link 112 and the base 110 provides an electrical signal correlated to the actual angular position of the link 112 relative to the stationary base. Pivotally connected to the upper end of the link 112 by a rotary joint 128 is a link 114 which pivots about axis 126. An angular position transducer 130 associated with the joint 128 and the link 114 provides an electrical signal correlated to the actual angular position of the link 114 with respect to the link 112. A link 116 connects to the link 114 via a rotary joint 133 for pivotal movement about axis 132. An angular position transducer 134 associated with the joint 133 and the link 116 provides an electrical signal correlated to the actual angular position of the link 116 with respect to the link 114.

Also included in the teaching robot depicted in FIG. 1 are links 118, 120, and 122 which are pivotally connected to links 116, 118, and 120, respectively, via rotary joints 144, 148, and 152, respectively. Angular position transducers 146, 150, and 154 associated with the rotary joints 144, 148, and 152, respectively, and the links 118, 120, and 122, respectively, provide electrical signals correlated to the actual angular position of the links 118, 120, and 122 with respect to the links 116, 118, and 120, respectively.

Mounted to the link 122 is a spray gun 158 having a barrel, a nozzle from which coating material is emitted, and a handle which mounts an ON/OFF switch.

The length of the links 112, 114, 116, 118, 120, and 122 of the teaching robot 108 of FIG. 1 are identical to the lengths of the links 12, 14, 16, 18, 20, and 22, respectively, of the work-performing robot 8, also shown in FIG. 1. Of course, the mass of the links 112, 114, 116, 118, 120, and 122 of the teaching robot is a mere fraction of that of their counterpart links 12, 14, 16, 18, 20, and 22 of the considerably more massive work-performing robot 8. Similarly, the joints 123, 128, 133, 144, 148, and 152 of the teaching robot 108 permit the same type of pivotal motion between their respectively associated links 112, 114, 116, 118, 120, and 122 as their counterpart rotary actuators 23, 28, 33, 44, 48, and 52 provide for their respectively associated links 12, 14, 16, 18, 20, and 22 of the work-performing robot 8.

To program the work robot 8 using the teaching robot 108, the teaching robot is placed in operative position relative to the workstation/workpiece. When the spray gun 158 mounted to the teaching robot output link is now moved manually by an operator grasping the gun handle thereof through a sequence of motions necessary to spray coat an object, which is possible due to its lightweight construction, the various links 112, 114, 116, 118, 120, and 122 of the teaching robot 108 move through a sequence of motions. Simultaneously, the transducers 124, 130, 134, 146, 150, and 154 of the teaching robot associated with the various teaching robot links 112, 114, 116, 118, 120, and 122 provide electrical outputs corresponding to the actual sequence of positions, or motions, through which the teaching robot links move in the course of manually moving the gun through the positions necessary to coat the object. These transducer signals corresponding to the actual positions of the different teaching robot links can be recorded by any suitable memory means (not shown). Thereafter, and with the work robot 8 in operative position relative to the workpiece/workstation, the recorded signals are input to the robot controller of the work-performing robot 8 where they are compared with signals correlated to the actual work robot link positions and link position error signals derived for input to the work robot link actuators to cause the work robot links to reproduce the motion of the teaching robot links in the manner previously described.

In the course of moving the gun 158 associated with the teaching robot 108 through the sequence of motions necessary to spray coat the desired object, the operator periodically manually actuates the spray gun trigger to emit spray coating material from the gun nozzle. By recording signals corresponding to the position of the trigger switch in conjunction with recording the position signals provided by the actual position transducers 124, 130, 134, 146, 150, and 154 of the teaching robot for the entire sequence of motions of the teaching robot links 112, 114, 116, 118, 120, and 122 produced by manual manipulation by the operator of the gun 158, a sequence of coordinated gun switch command signals and desired robot link position signals can be stored. These stored signals can then be input to the robot controller and stored, and subsequently repetitively read out from storage within the robot controller and used for repeating the programmed sequence of motions with the work-performing robot 8 to coat the object with a gun mounted thereto, which sequence of motions was first performed manually by the operator with the teaching robot 108 and gun 158.

To facilitate preparation of an accurate program with the teaching robot 108, that is, a program which when input to the work robot 8 will result in positioning the output link thereof in the exact same sequence of spatial positions through which the output of the teaching robot moved in the course of preparing the program, it is important that the output signals of the link position transducers of both the teaching robot and the work robot be identical when the teaching and work robots are in operative position with respect to the workpiece/workstation and the respective output links thereof are identically positioned. To insure identical transducer outputs of the respective work robot and teaching robot links when they are in operative position with respect to a workstation and their respective output links are at the identical same position and orientation in space, the calibration fixture 200 of this invention is provided.

The calibration fixture 200 includes a stationary member 202 which is mounted on a tripod or base 204 in an arbitrary fixed position and orientation in space relative to the common base 9 which mounts the work robot 8 and teaching robot 108. To facilitate repeatability in positioning the stationary member 202 in the same fixed position and orientation in space relative to the base 9 which supports the work robot 8 and teaching robot 108, the tripod 204 is provided with fasteners 204A and 204B which are secured to associated connecting means 205 mounted on the lower portion of the lower base section 9A. At the apex of the tripod base a suitable fastener, such as a weldment (not shown), is provided to facilitate stationarily mounting the member 202 relative to the tripod 204.

The stationary member 202 is provided with a pair of elongated stationary abutments 206 and 208 which are suitably fixed to the upper surface 202B thereof. The elongated stationary abutment 206 includes a shoulder 206A defined by perpendicular horizontal surface 206B and vertical surface 206C. Similarly, elongated abutment 208 includes a shoulder 208A defined by perpendicular horizontal surface 208B and vertical surface 208C. Horizontal surface 206B of elongated stationary abutment 206 and horizontal surface 208B of elongated stationary abutment 208A collectively define a first locating surface in a horizontal plane parallel to the Y—Z plane. Vertical surface 206C of elongated stationary abutment 206 constitutes a second locating surface in a vertical plane parallel to the X—Z plane, while vertical surface 208C of elongated stationary abutment 208 defines a third locating surface in a vertical plane parallel to the X—Y plane. The first locating surface defined by surfaces 206B and 208B, the second locating surface 206C, and the third locating surface 208C are mutually perpendicular.

The calibration fixture also includes a movable member 210. The movable member 210 is adapted to be secured to the output link 22 of the work robot 8 or the output link 122 of the teaching robot 108, as desired. When so secured and the movable member 210 appropriately seated relative to the locating surfaces of the stationary member 202, in a manner to be described, the output link 22 of the work robot 8 or the output link 122 of the teaching robot 108, as the case may be, occupies a single and invariant predetermined reference spatial position and orientation. Since the work robot 8 and the teaching robot 108 have a maximum of six links and six associated joints, the respective robots are statically determinate. As such, when the output links 22 and 122 of the work robot 8 and teaching robot 108 are forced to occupy, on an alternative basis, a single invariant predetermined reference spatial position and orientation, the respective links of the work robot 8 and teaching robot 108 will be identically positioned and oriented in space. If, under such circumstances, the respective output signals of the corresponding link transducers of the work robot and teaching robots are made to be identical in magnitude, the position transducers of the robots are calibrated.

The movable member 210, which is preferably plate-shaped, includes a lower planar surface 210B which constitutes a first locating surface. The movable member 210 includes a second locating surface 210C and a third locating surface 210C' defined by intersecting edge surfaces of the plate-shaped movable member. Locating surfaces 210B, 210C, and 210C' are mutually perpendicular.

Extending upwardly from the upper surface 210D of the movable member 210 is a fastening device 212 with respect to which the output link 22 of the work robot 8 or the output link 122 of the teaching robot 108 can be fastened in but a single relative position and orientation with respect thereto. The fastening device 212 includes a block 214 integral with the plate 210 which is provided with a semi-cylindrical vertical surface 214A having a vertical slot 214B parallel to the axis of the semi-cylindrical surface 214A. The vertical dimension of the semi-cylindrical surface 214A is less than the vertical distance D of block 214 to provide a locating surface or shoulder 214C for reasons to become apparent hereafter. Associated with the block 214 is a block 216 which is provided with a semi-cylindrical surface 216A disposed opposite the semi-cylindrical surface 214A. The semi-cylindrical surface 216A extends throughout the entire height D' of the block 216. Suitable threaded fasteners 218A and 218B passing through slightly oversize bores in the block 216 are threadedly engaged in threaded openings in the block 214 to facilitate securely clamping in the socket 215, which is formed by the confronting cylindrical surfaces 214A and 216A, the link 22 of work robot 8 or the output link 122 of the teaching robot 108.

The work robot output link 22 and the teaching robot output link 122 are each provided with a longitudinal rib 22A and 122A. Ribs 22A and 122A snugly fit in the slot 214B of block 214. When the output link 22 of the work robot 8 is in the socket 215 defined by semi-cylindrical surfaces 214A and 216A, with locating ridge 22A in slot 214B and the lowermost surface 22B in contact with the locating surface 214C, the work robot output link 22 is located, both axially and angularly, in the single predetermined reference spatial position and orientation with respect to the movable member 210. Similarly, when the output link 122 of the teaching robot 108 is positioned in the socket 215 defined by semi-cylindrical surfaces 214A and 216A, with ridge 122A engaged in slot 214B and the lower surface 122B against locating surface 214C, the output link 122 of the teaching robot 108 is located in the single predetermined reference spatial position and orientation with respect to the movable member 210.

Cam positioning means in the form of a cam slot 220 in plate 210 and a cam screw 222 threaded in a suitable threaded aperture 202A in the plate 202 are provided to simultaneously position the locating surface 210B in contact with locating surfaces 206B and 208B, locating surface 210C in contact with locating surface 208C, and locating surface 210C in contact with locating surface 206C. This locates the movable plate 210 and in turn the output link 22 of the work robot 8 or the output shaft 122 of the teaching robot 108, depending upon which robot output link is mounted in socket 215, in the single invariant, predetermined reference spatial position and orientation with respect to the stationary member 202 and hence with respect to the common base 9 which supports the work robot 8 and teaching robot 108.

The cam screw 222 includes a threaded shank 222A which threadedly engages the aperture 202A provided in the stationary plate 202. The cam screw 222 further includes a conical cam surface 222B and a suitable knob 222C to facilitate manually rotating the threaded fastener 222. The cam slot 220 extends from the approximate midpoint of the edge 210F of the plate 210 toward the axis of the semi-cylindrical surface 214A such that it bisects the angle formed by the locating surfaces 210C and 210C'. As shown in FIGS. 2 and 4, the confronting side walls 220A and 220B and the end wall 220C of the cam slot 220 are angled at approximately 45° with respect to the locating surface 210B of the movable member 210. The conical surface 222B of the cam screw 222 is similarly angled at approximately 45° relative to the longitudinal axis of the threaded shank 222A such that when the threaded shank 222A is engaged in threaded opening 202A in stationary member 202 the angulation of the cam surface 222B will be at 45° to the locating surface defined by abutment surfaces 206B and 208B.

With the cam slot 220 and cam surface 222B configured as described, and the movable plate 210 generally overlying the stationary plate 202 with cam screw 222 engaged with cam slot 220, when the cam screw is tightened the movable plate 210 is urged toward the stationary plate 202 to effect simultaneous engagement of (a) movable plate surface 210B with stationary abutment surfaces 206B and 208B, (b) movable plate surface 210C with stationary plate surface 208C, and (c) movable plate surface 210C' with stationary plate surface 206C. When the enumerated locating surfaces of the movable member 210 are simultaneously urged into contact with the enumerated locating surfaces of the stationary member 202 by cam screw 222, the output link 22 of the work robot 8 or the output link 122 of the teaching robot 108, as the case may be, engaged in the socket 215 defined by surfaces 214A, 214B, 214C, and 216A, will occupy a single invariant, predetermined reference spatial position and orientation. To provide for conveniently moving the movable fixture member 210 relative to the stationary fixture plate 202, particularly when the output link of a robot is secured in socket 215 of the movable member, a handle 217 extends from block 214.

To calibrate the position transducers of the work robot 8 and teaching robot 108 such that the robot link position transducer outputs of the work robot 22 and teaching robot 122 are the same when their respective output links 22 and 122 are in the same single invariant, predetermined reference position and orientation established by the fixture 200, the following steps are taken. First, the teaching robot 108 is located in operative position to the workplace whereat calibration fixture 200 is positioned, and the output link 122 thereof is secured in socket 215 of the movable member 210 of the calibration fixture. The movable member 210 is then operatively engaged with the stationary member 202 and the cam screw tightened in slot 220 to simultaneously engage the respective locating surfaces of the stationary and movable members of the fixture 200 to locate the teaching robot output link 122 in the predetermined reference spatial position and orientation. With the output link 122 of the teaching robot so positioned, the output signal magnitudes of the teaching robot link position transducers 124, 130, 134, 146, 150, and 154 are recorded.

The cam screw 222 is now loosened and the movable member 210 disengaged from the stationary member 202. The movable member 210 is then demounted from the output link 122 of teaching robot 108, and the upper section 9B of the base 9 rotated 180° about vertical axis 9D to locate the work robot 8 in operative relationship to the workstation whereat the calibration fixture 200 is located. With the work robot 8 so positioned, the output link 22 thereof is secured in socket 215 of the calibration fixture 200 and the movable member 210 located in operative relation to the stationary member 208 whereupon the cam screw 222 positioned in slot 220 is tightened to simultaneously engage the respective locating surfaces of the movable member with those of the stationary member. The position transducers 24, 30, 34, 46, 50, and 54 of the work robot 8 are now adjusted such that their respective outputs equal the outputs of the corresponding teaching robot link position transducers 124, 130, 134, 146, 150, and 154 which previously existed when the output link 122 of the teaching robot 108 was in the predetermined reference spatial position and orientation occasioned by the movable fixture member 210 of the fixture 200 being secured thereto and located such that its locating surfaces simultaneously contacted the corresponding locating surfaces of the stationary fixture member 202.

With the outputs of the link position transducers of the work robot 8 equal to those of the teaching robot 108 when their respective output links 22 and 122 are located in the same predetermined reference spatial position and orientation, the link position transducers of the work robot and teaching robot are now calibrated. As a consequence, the teaching robot 108 can be moved through a desired sequence of motions and the transducer outputs thereof recorded in a suitable memory to facilitate generation of a program which, when the work robot 8 is in operative position with respect to the workplace (with the calibration fixture and tripod removed) and input with the recorded signals, will cause the work robot to accurately execute the same programmed motion sequence as was previously executed by the teaching robot during the programming phase when the latter was under manual control by programming personnel. Obviously, subsequent to calibration, but prior to program generation with the teaching robot 108, the calibration fixture 200 and tripod are removed from the workplace to avoid mechanical interference between the fixture/tripod and the teaching robot during programming.

Adjustment of the link position transducers to equalize their outputs when the links of the teaching and work robots are identically positioned and oriented, the transducers can be provided with suitable adjustment potentiometers, zero adjusting circuitry or the like, as is well known in the art and therefore not further discussed herein.

While the invention has been described in connection with a preferred embodiment thereof in which the work robot position transducers are adjusted to match those of the teaching robot, the reverse is also possible in which the teaching robot position transducers are adjusted to match their outputs to those of the work robot undergoing calibration. The advantage of the former and preferred approach, i.e., adjusting the work robot to match the teaching robot, is that the teaching robot is the standard, which is particularly desirable where multiple robots are calibrated to equalize the respective outputs of their corresponding link position transducers, with the teaching robot link transducer outputs being the standard for all the robots.

The calibration fixture of this invention is capable of accurately calibrating teaching and work robots which are statically determinate, i.e., having up to and including six degrees of freedom. If it is desired to calibrate work and teaching robots which are statically indeterminate, i.e., having more than six degrees of freedom, with the calibration fixture of this invention, it is necessary to reduce the number of degrees of freedom of the work and teaching robots to a maximum of six degrees of freedom. This can be done by immobilizing in identical orientation as many corresponding pairs of joints of the teaching and work robots as are necessary to reduce the number of degrees of freedom thereof to no more than six degrees of freedom.

For example, if the work and teaching robots each have seven degrees of freedom, the azimuthal actuators 23 and 123 of the work and teaching robots 8 and 108, respectively, can be immobilized such that when their robot associated output links 22 and 122 are mounted in the calibration fixture, the output links 12 and 112 of the azimuthal joints 10 and 110 occupy the same relative azimuthal orientations about their respective X and X' axes. This can be accomplished by securing to the frame 200 a stationary vertical post (not shown) against which one of the links 114, 116, or 118 of the teaching robot 108 is maintained in contact during calibration of the teaching robot, thereby establishing a predetermined and fixed angular relationship between the teaching robot link 112 and its associated actuator 110. Similarly, when the work robot 8 is being calibrated, one of the links 14, 16, or 18 is brought into contact with the stationary vertical post (not shown) and maintained in contact therewith during calibration to maintain the orientation of work robot link 12 of actuator 10 in the same orientation as link 112 of actuator 110 of the teaching robot 108 when the teaching robot was being calibrated.

We claim:
1. Apparatus comprising:
   a relatively massive powered work robot having a base from which extends a series of articulated links interconnected at joints to provide plural degrees of freedom, each joint having an actuator for moving the links interconnected thereat relative to each other and a position transducer for providing a signal correlated to the relative position of the links interconnected thereat, said series of links terminating in an output link,
   a relatively lightweight manually manipulatable unpowered teaching robot having a base from which extends a series of articulated links interconnected at joints to provide plural degrees of freedom, each joint having a position transducer for providing a signal correlated to the relative position of the links interconnected thereat, said series of links terminating in an output link, said teaching robot links and degrees of freedom simulating those of said work robot,
   means to alternatively mount said work robot base and teaching robot at the same operative position in space,
   a calibration fixture including:
   a stationary member having first, second, and third manually orthogonal locating surfaces,
   means to mount said stationary member in a fixed spatial position displaced from said same operative position in space, a movable member alternatively mountable to said work robot output link and said teaching robot output link, said movable member having first, second, and third mutually orthogonal locating surfaces configured to simultaneously contact said respective first, second, and third locating surfaces of said stationary member only when said movable member occupies a predetermined reference spatial position and orientation, cam positioning means jointly associated with said movable and stationary members to cam their respective first, second, and third locating surfaces simultaneously into contact with each other to locate said movable member at said predetermined reference spatial position and orientation, and adjustment means associated with said position transducers of at least one of said work robot and teaching robot to equalize the outputs of the respective work robot and teaching robot tranducers when their bases are located in said same operative position in space and their respective output links are mounted to said movable member which has been located by said cam positioning means to occupy said predetermined reference spatial position and orientation.

2. The apparatus of claim 1 wherein said joints are pivotal, and wherein said movable member and output links have cooperating locating elements to facilitate mounting said movable member alternatively to said output links in only one angular orientation relative thereto.

3. The apparatus of claim 2 wherein said each output link has an axis about which it is rotatable, wherein said movable member has a socket provided with an axis into which said output links are alternatively positionable with their respective axes parallel to said axis of said socket, and wherein said cooperating locating elements collectively include a projection and associated projection-receiving slot into which said projection seats when said output links are alternatively positioned in said socket.

4. The apparatus of claim 1 wherein
one of said movable and stationary members includes a plate having a pair of elongated abutments each having an elongated shoulder, said shoulders each having a first elongated surface which collectively comprise said first locating surface of said one member, said shoulders each also having a second elongated surface which is perpendicular to its respectively associated first elongated surface, said second elongated surfaces collectively comprising said second and third locating surfaces of said one member, and the other of said movable and stationary members includes a plate having (a) a planar surface defining said first locating surface thereof, and (b) a pair of adjacent edge surfaces disposed perpendicular to each other and to said planar surface, collectively defining said second and third locating surfaces of said other member.

5. The apparatus of claim 4 wherein said cam positioning means includes (a) a slot in said plate of said other member bounded by cam surfaces, said slot being disposed to bisect the angle formed by said pair of adjacent edge surfaces, and (b) a screw threadable into said plate of said one member and having a conical screw head, said conical screw head engaging said cam surfaces bounding said slot to simultaneously urge (a) said planar surface of said plate of said other member toward said first elongated surfaces of said elongated abutments, and (b) said edge surfaces of said plate of said other member toward said second elongated surfaces of said elongated abutments, to drive said movable member to said predetermined reference spatial position and orientation when said screw is threaded into said plate of said one member.

6. The apparatus of claim 5 wherein said plate of said movable member includes a handle projecting therefrom to enhance ease of placement of said first, second, and third locating surfaces thereof into simultaneous contact with said first, second, and third locating surfaces of said stationary member.

7. A calibration fixture for use in conjunction with (a) a relatively massive powered work robot having a base from which extends a series of articulated links interconnected at joints to provide plural degrees of freedom, each joint having an actuator for moving the links interconnected thereat relative to each other and a position transducer for providing a signal correlated to the relative position of the links interconnected thereat, said series of links terminating in an output link, and (b) a relatively lightweight manually manipulatable unpowered teaching robot having a base from which extends a series of articulated links interconnected at joints to provide plural degrees of freedom, each joint having a position transducer for providing a signal correlated to the relative position of the links interconnected thereat, said series of links terminating in an output link, said teaching robot links and degrees of freedom simulating those of said work robot, (c) means to alternatively mount said work robot base and teaching robot base at the same operative position in space, and (d) adjustment means associated with said position transducers of at least one of said work and teaching robots to equalize the outputs thereof when their bases are located in said same operative position in space and their respective output links are mounted to said movable member which has been located to occupy a predetermined reference spatial position and orientation, said calibration fixture comprising:

a stationary member having first, second, and third mutually orthogonal locating surfaces, means to mount said stationary member in a fixed spatial position displaced from said same operative position in space, a movable member alternatively mountable to said work robot output link and said teaching robot output link, said movable member having first, second, and third mutually orthogonal locating surfaces configured to simultaneously contact said respective first, second, and third locating surfaces of said stationary member only when said movable member occupies said predetermined reference spatial position and orientation, and cam positioning means jointly associated with said movable and stationary members to cam their respective first, second, and third locating surfaces simultaneously into contact with each other to locate said movable member at said predetermined reference spatial position and orientation.

8. The apparatus of claim 7 wherein one of said movable and stationary members includes a plate having a pair of elongated abutments each having an elongated shoulder, said shoulders each having a first elongated surface which collectively comprise said first locating surface of said one member, said shoulders each also having a second elongated surface which is perpendicular to its respectively associated first elongated surface, said second elongated surfaces collectively comprising said second and third locating surfaces of said one member, and the other of said movable and stationary members includes a plate having (a) a planar surface defining said first locating surface thereof, and (b) a pair of adjacent edge surfaces disposed perpendicular to each other and to said planar surface, collectively defining said second and third locating surfaces of said other member.

9. The apparatus of claim 8 wherein said cam positioning means includes (a) a slot in said plate of said other member bounded by cam surfaces, said slot being disposed to bisect the angle formed by said pair of adjacent edge surfaces, and (b) a screw threadable into said plate of said one member and having a conical screw head, said conical screw head engaging said cam surfaces bounding said slot to simultaneously urge (a) said planar surface of said plate of said other member toward said first elongated surfaces of said elongated abutments, and (b) said edge surfaces of said plate of said other member toward said second elongated surfaces of said elongated abutments, to drive said movable member to said predetermined reference spatial position and orientation when said screw is threaded into said plate of said one member.

10. The apparatus of claim 9 wherein said plate of said movable member includes a handle projecting therefrom to enhance ease of placement of said first, second, and third locating surfaces thereof into simultaneous contact with said first, second, and third locating surfaces of said stationary member.

11. A calibration fixture for use in conjunction with (a) a relatively massive powered work robot having a base from which extends a series of articulated links interconnected at joints to provide plural degrees of freedom, each joint having an actuator for moving the links interconnected thereat relative to each other and a positon transducer for providing a signal correlated to the relative position of the links interconnected thereat, said series of links terminating in an output link, and (b) a relatively lightweight manually manipulatable unpowered teaching robot having a base from which extends a series of articulated links interconnected at joints to provide plural degrees of freedom, each joint having a position transducer for providing a signal correlated to the relative position of the links interconnected thereat, said series of links terminating in an output link, said teaching robot links and degrees of freedom simulating those of said work robot, (c) means to alternatively mount said work robot base and teaching robot base at the same operative position in space, and (d) adjustment means associated with said position transducers of at least one of said work and teaching robots to equalize the outputs thereof when their bases are located in said same operative position in space and their respective output links are mounted to said movable member which has been located to occupy a predetermined reference spatial position and orientation, said calibration fixture comprising:

a stationary member having first, second, and third mutually orthogonal locating surfaces, means to mount said stationary member in a fixed spatial position displaced from said same operative position in space, a movable member alternatively mountable to said work robot output link and said teaching robot output link, said movable member having first, second, and third mutually orthogonal locating surfaces configured to simultaneously contact said respective first, second, and third locating surfaces of said stationary member only when said movable member occupies said predetermined reference spatial position and orientation, and positioning means jointly associated with said movable and stationary member for positioning their respective first, second, and third locating surfaces simultaneously into contact with each other to locate said movable member at said predetermined reference spatial position and orientation.

12. The apparatus of claim 1 wherein said work robot links do not exceed six in number, and said teaching robot links do not exceed six in number.

13. The apparatus of claim 2 wherein said work robot links do not exceed six in number, and said teaching robot links do not exceed six in number.

* * * * *